(12) United States Patent
Uenver

(10) Patent No.: US 8,567,812 B2
(45) Date of Patent: Oct. 29, 2013

(54) CONFIGURATION FOR FASTENING A LIQUID CONTAINER

(75) Inventor: Gevriye Uenver, Frankfurt (DE)

(73) Assignee: GM Global Technology Operations LLC, Detroit, MI (US)

(*) Notice: Subject to any disclaimer, the term of this patent is extended or adjusted under 35 U.S.C. 154(b) by 296 days.

(21) Appl. No.: 13/006,462

(22) Filed: Jan. 14, 2011

(65) Prior Publication Data

US 2011/0180576 A1     Jul. 28, 2011

(30) Foreign Application Priority Data

Jan. 14, 2010   (DE) .................... 10 2010 004 538

(51) Int. Cl.
*B60R 99/00*     (2009.01)
(52) U.S. Cl.
USPC ......... 280/727; 248/674; 224/148.1; 224/548
(58) Field of Classification Search
USPC ............. 280/727; 248/323, 317, 674, 223.41; 224/148.1, 517, 547, 548, 557; 211/71.01, 13.1
See application file for complete search history.

(56) References Cited

U.S. PATENT DOCUMENTS

| | | | | |
|---|---|---|---|---|
| 4,589,376 A | * | 5/1986 | Albertson | ................... 123/25 L |
| 5,058,694 A | | 10/1991 | Iwanaga | |
| 8,281,967 B2 | * | 10/2012 | Evans | ........................... 224/404 |
| 2002/0074174 A1 | * | 6/2002 | Dettling et al. | .............. 180/68.1 |
| 2007/0235486 A1 | * | 10/2007 | Bernard | .......................... 224/400 |
| 2008/0030072 A1 | | 2/2008 | Legeza et al. | |
| 2012/0248121 A1 | * | 10/2012 | Rihtar | ........................... 220/562 |

FOREIGN PATENT DOCUMENTS

| | | |
|---|---|---|
| DE | 19502999 A1 | 8/1995 |
| DE | 19961821 A1 | 7/2000 |
| EP | 0399440 A2 | 11/1990 |
| FR | 2787091 A1 | 6/2000 |
| JP | 2004190231 A | 7/2004 |

OTHER PUBLICATIONS

British Patent Office, British Search Report for British Application No. 1100593.1, Apr. 6, 2011.
German Search Report dated Sep. 14, 2010, issued in Application No. 10 2010 004 538.1.

* cited by examiner

*Primary Examiner* — Drew Brown
(74) *Attorney, Agent, or Firm* — Ingrassia Fisher & Lorenz, P.C.

(57) ABSTRACT

A configuration is provided for fastening a liquid container in an engine compartment of a motor vehicle, including, but not limited to a liquid container and a fastening holder, using which the liquid container is fastened on the vehicle body of the motor vehicle, the liquid container being situated so it is displaceable on the fastening holder.

19 Claims, 4 Drawing Sheets

CONFIGURATION FOR FASTENING A LIQUID CONTAINER

CROSS-REFERENCE TO RELATED APPLICATION

This application claims priority to German Patent Application No. 102010004538.1, filed Jan. 14, 2010, which is incorporated herein by reference in its entirety.

TECHNICAL FIELD

The technical field relates to a configuration for fastening a liquid container, in particular a brake fluid container, in an engine compartment or in other areas inside a motor vehicle.

BACKGROUND

Liquid containers situated in an engine compartment, for example, such as a brake fluid container, are typically accessible hardly or not at all in the installed state, in order to be able to refill them with new liquid. For example, brake fluid containers are provided directly below the windshield, usually between the lower edge of the windshield and the battery situated in the engine compartment, so that the liquid container is not fillable in the installed state, since the windshield prevents an insertion of filling pliers to the cover opening of the liquid container.

At least one object is therefore to provide a configuration for fastening a liquid container in an engine compartment of a motor vehicle, which allows filling of the liquid container in an installed state. In addition, other objects, desirable features and characteristics will become apparent from the subsequent summary and detailed description, and the appended claims, taken in conjunction with the accompanying drawings and this background.

SUMMARY

The configuration according to an embodiment of the invention for fastening a liquid container in a motor vehicle has a liquid container and a fastening holder, using which the liquid container is fastened on the vehicle body of the motor vehicle. The liquid container is situated so it is displaceable on the fastening holder.

The liquid container is preferably designed as a brake fluid container. Because the liquid container is now situated so it is displaceable in the engine compartment, the liquid container can be displaced as needed into the desired position. To fill the liquid container it can be displaced into a first position, for example, in which the liquid container is not concealed by other objects situated in the engine compartment, such as the windshield or the battery, so that the liquid container can be filled without problems in the factory. After the filling of the liquid container, it can be displaced from the first position into a second position, in which the liquid container is situated in the engine compartment so that it is housed in a space-saving manner, for example, it is stowed between the lower edge of the windshield and the battery. In this second position, the liquid container is preferably not fillable using a filling device, but rather is fixed in a permanent position, so that it cannot slip during the driving operation of the vehicle. Due to the displaceable configuration of the liquid container, the handling of the liquid container is substantially simplified, since it can remain in the engine compartment for filling, without other component in the engine department having to be removed or the liquid container itself having to be removed.

According to another embodiment, the liquid container has a holding arm, the holding arm being situated so it is displaceable on the fastening holder. The holding arm is preferably situated laterally on the liquid container, the liquid container preferably being situated at least partially below the fastening holder using the holding arm, the holding arm extending vertically upward in the direction of the fastening holder from the liquid container. The holding arm is used as a type of guide, using which the liquid container is displaceable along the fastening holder, and is simultaneously used as a type of fastening or connection between the liquid container and the fastening holder.

According to an embodiment, the holding arm has a grooved recess, using which the holding arm is situated so it is displaceable on the fastening holder. The grooved recess is used as a guide of the liquid container or the holding arm relative to the fastening holder. The grooved recess preferably specifies the possible displacement route in this case, the grooved recess determining the first possible position and the second possible position of the liquid container relative to the fastening holder. The grooved recess can be implemented as a through opening or also as a recess provided in the holding arm, which has a lesser thickness than the thickness of the holding arm.

A fastening element is preferably provided for connecting the holding arm to the fastening holder. The fastening element is preferably used, on the one hand, for the purpose of being able to displace the liquid container relative to the fastening holder and, on the other hand, of being able to fasten the liquid container in the second position permanently on the fastening holder via the holding arm. The fastening element is preferably implemented as a detachable fastening element.

The fastening element is preferably situated on the holding arm within the grooved recess. The fastening element is preferably provided in such a manner that the fastening element is fixed on the fastening holder in a permanent position and engages in the grooved recess of the holding arm and can thus determine the displacement route of the holding arm via the grooved recess.

The fastening element is preferably provided as a screw connection. The screw connection comprises a screw and a nut situated thereon, the fastening element being provided on the holding arm in such a manner that the shaft of the screw is guided through the grooved recess and the screw head is used so that the holding arm cannot slip off of the fastening element, since the screw head has a greater diameter than the width of the grooved recess. Due to the implementation of the fastening element as a screw connection, an easily detachable connection of the holding arm to the fastening holder can be performed. However, it is also possible to implement the fastening element in a different way than a screw connection, for example, in the form of a pin, a clip, or the like.

According to a further embodiment, the fixing of the holding arm in a first position and in a second position is performed via a cross-sectional change provided in the grooved recess. For example, the grooved recess can have a greater cross-sectional area in the area of the first position and the second position than the connection between the first position and the second position, so that, for example, the first position and the second position are implemented in the form of a notch in the grooved recess. Furthermore, it is also possible to provide detent lugs within the grooved recess, which delimit the first position and the second position in each case from the connection area between the first position and the second position, so that to transfer the liquid container or the holding arm from the first position into the second position and vice versa, the fastening element situated in the grooved recess must first pass the detent lugs, which is only possible through an external application of force, so that the holding arm or the liquid container cannot unintentionally change its position. Furthermore, it is also possible to insert a clip insert into the grooved recess, preferably in the area of the first position, using which the fastening element is held in the position.

Furthermore, guide means for guiding the liquid container are advantageously provided on the fastening holder. The guide means may be implemented in the form of guide flanges, for example, into which a part of the liquid container, for example, a guide groove provided along the surface of the liquid container, can engage, and additional guiding achieved using the holding arm is thus possible. The guide means may prevent undesired tilting of the liquid container relative to the fastening holder, for example. In addition, the guide means can be used as additional fastening means of the liquid container on the fastening holder. Targeted and secure guiding of the liquid container upon displacement of the liquid container relative to the fastening holder is thus possible.

A motor vehicle is also provided comprising a configuration implemented and refined as described above for fastening a liquid container in an engine compartment of the motor vehicle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
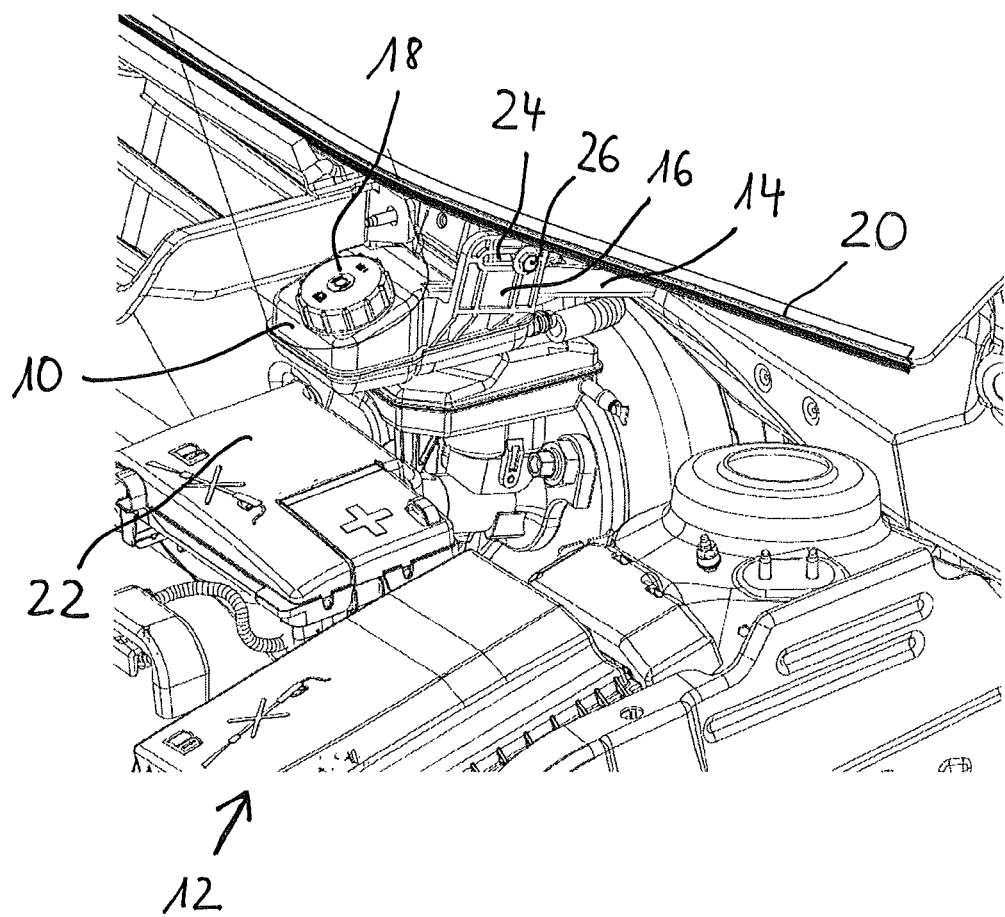
FIG. 1 shows a schematic view of a configuration according to an embodiment of the invention in an installed state.

FIG. 1 shows a schematic view of a configuration according to an embodiment of the invention for fastening a liquid container 10, in particular a brake fluid container, in an engine compartment 12 of a motor vehicle, the liquid container 10 being fastened, preferably welded, using a fastening holder 14, which is situated on the vehicle body of the motor vehicle, in the engine compartment 12, the liquid container 10 being situated so it is displaceable on the fastening holder 14. For this purpose, the liquid container 10 has a holding arm 16, using which the liquid container 10 is situated so it is displaceable on the fastening holder 14. The holding arm 16 is permanently connected to the liquid container 10. The liquid container 10 is situated below the fastening holder 14, the holding arm 16 extending laterally from the liquid container 10 up to the fastening holder 14.

To fill the liquid container 10, it has a filling opening closable using a cover 18. The liquid container 10 is situated between the lower edge of a windshield 20 and a battery 22 in the engine compartment 12, because the liquid container 10 is situated so it is displaceable in the engine compartment 12, the liquid container 10 being able to be moved away from the area of the windshield 20 and the battery 22 far enough that the liquid container 10 is fillable with liquid via the filling opening, preferably in the factory.

Figure 2:
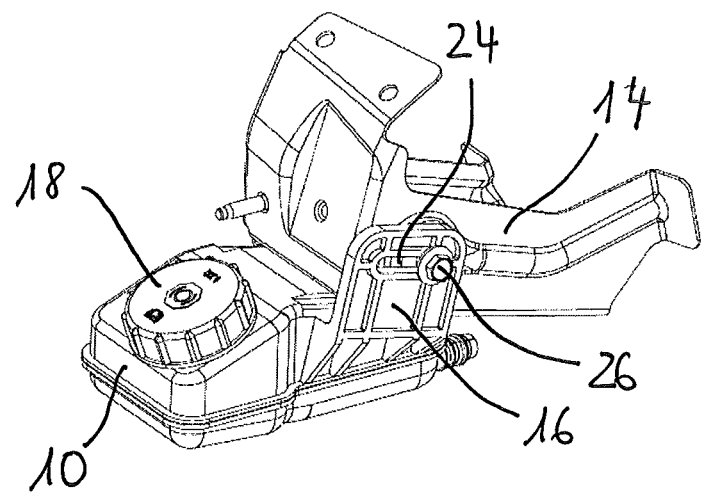
FIG. 2 shows a schematic view of the configuration according to an embodiment of the invention in a first position.
Figure 3:
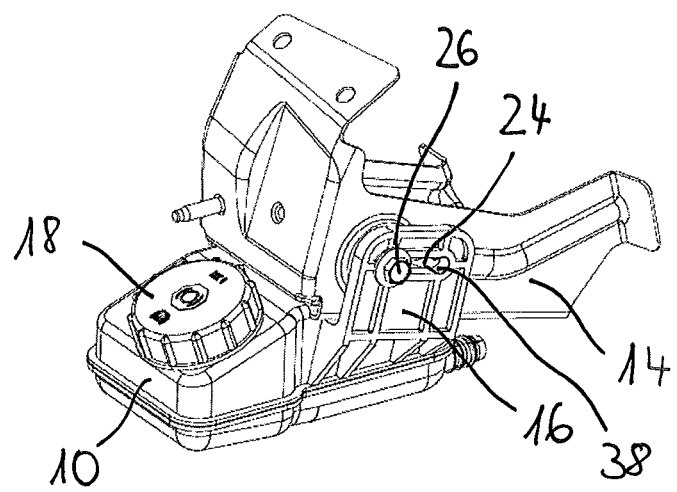
FIG. 3 shows a schematic view of the configuration according to an embodiment of the invention in a second position.

For this purpose, the liquid container 10 can be moved into a first position as shown in FIG. 1 and FIG. 2, in which the liquid container 10 is fillable. In FIG. 3, the liquid container 10 is shown in a second position, no filling of the liquid container 10 in the factory preferably occurring in this position.

To transfer the liquid container 10 into the first position and into the second position, the holding arm 16 has a grooved recess 24, which is implemented in this case as an oblong through opening. The grooved recess 24 forms the possible displacement route of the liquid container 10 from the first position into the second position and vice versa.

A fastening element 26 is provided to connect the holding arm 16 to the fastening holder 14, the fastening element 26 being guided by the grooved recess 24. The fastening element 26 forms a delimitation element for the displacement movement of the holding arm 16 or the liquid container 10 in this case.

As is recognizable in FIG. 3, a clip insert 38 is situated in the grooved recess 24, the clip insert 38 being situated in the first position inside the grooved recess 24. Using the clip insert 38, the fastening element 26 can be held in the first position shown here, for example. The clip insert 38 can be placed appropriately in the grooved recess 24 for this purpose. The fastening element 26 is preferably implemented in this case as a screw having a shaft comprising a thread, so that the fastening element 26 can be fixed in the first position using the clip insert 38 and, in the second position, the fastening element 26 can be screwed into the fastening holder 14 for fixing in this position.

Figure 4:
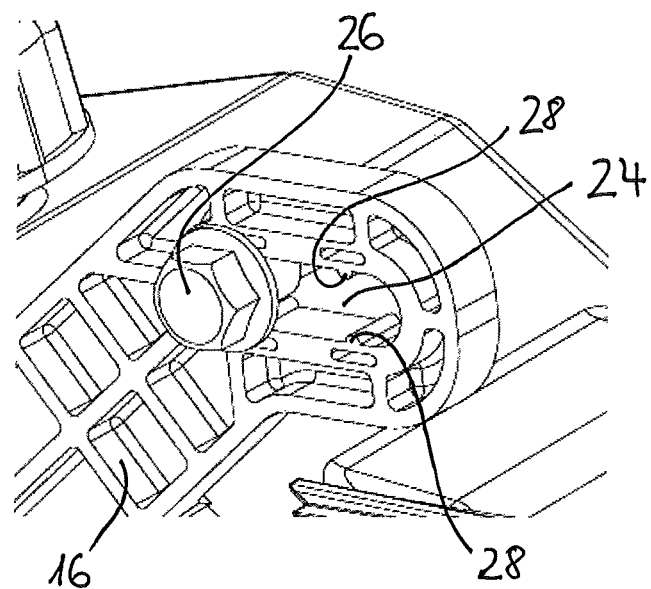
FIG. 4 shows a schematic view of the holding arm as per an embodiment according to an embodiment of the invention.

To fix the holding arm 16 or the liquid container 10 in the first position and in the second position, it is further possible, as shown in FIG. 4, that the grooved recess 24 has a cross-sectional change in the form of detent lugs 28 shaped into the grooved recess 24, the detent lugs 28 delimiting the area of the first position and the area of the second position from the connection area between the first position and the second position. To transfer the holding arm 16 or the liquid container 10 from the first position into the second position and vice versa, a specific force must be applied to the holding arm 16 to overcome the detent lugs 28 using the fastening element 26. The fastening element 26 is situated in a permanent position on the fastening holder 14, the holding arm 16 being displaceable along the fastening element 26 using the grooved recess 24. In the embodiment shown in FIG. 4, the fastening element 26 preferably has a shaft, along which the grooved recess is guided, the shaft preferably being implemented as flat, without a thread.

Figure 5:
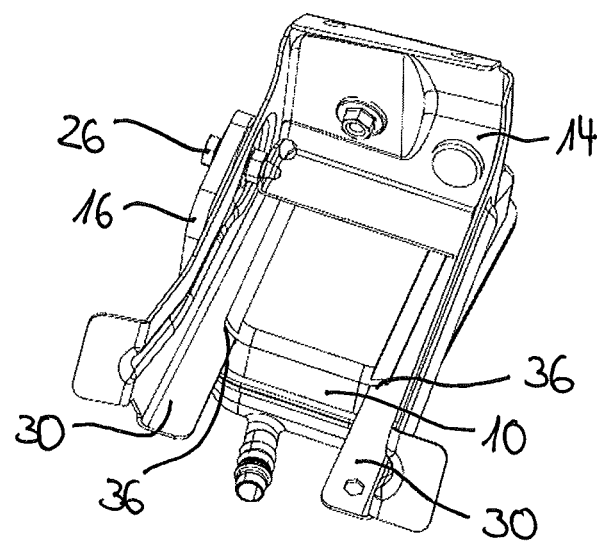
FIG. 5 shows a further schematic view of the configuration according to an embodiment of the invention shown in FIG. 3.

To be able to implement additional fastening and guiding of the liquid container 10, guide means 30 in the form of guide flanges are provided on the fastening holder 14, as shown in FIG. 5, which may engage in guide grooves 36 provided on the liquid container 10, for example, so that the liquid container 10 is additionally situated so it is displaceable on the fastening holder 14 via the guide means 30 engaging in the guide grooves 36.

Figure 6:
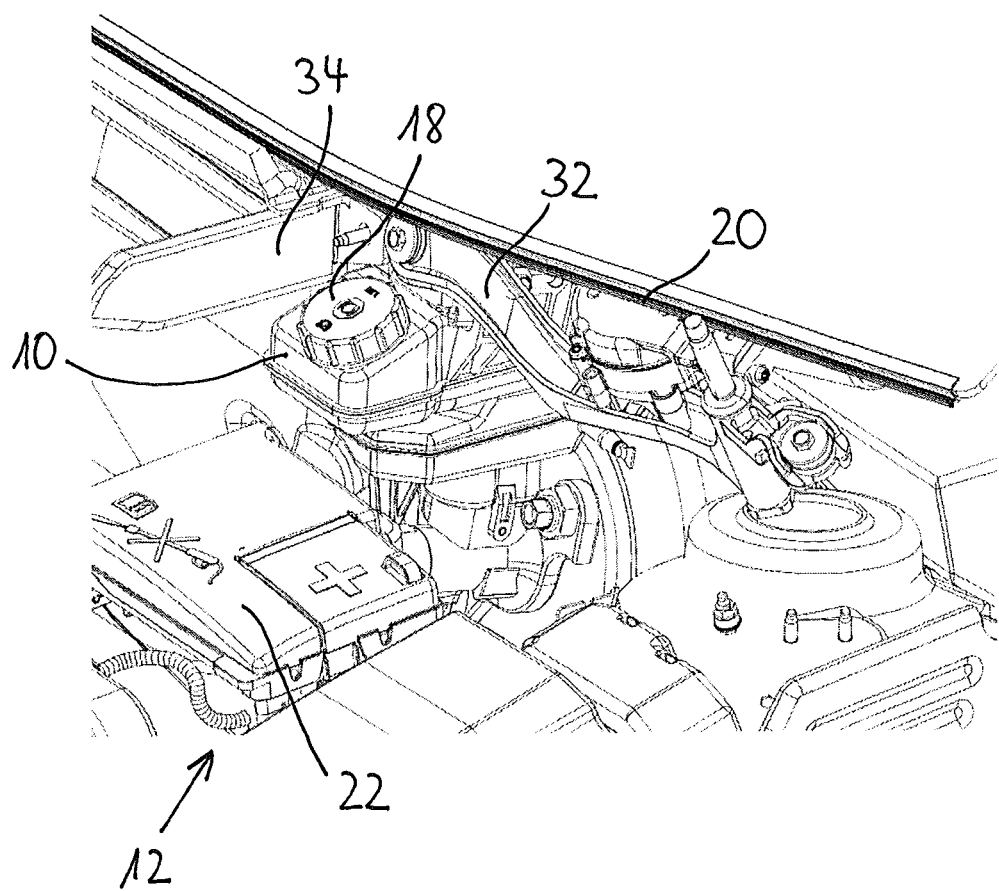
FIG. 6 shows a further schematic view of the configuration according to an embodiment of the invention shown in FIG. 1 in an installed state.

FIG. 6 shows a further view of the configuration according to an embodiment of the invention in a state installed in the engine compartment 12, it being recognizable in this case that still further components may be fastened on the fastening holder 14 in addition to the liquid container 10. In the embodiment shown here, a holder of the wiper rod assembly 32 and an air inlet housing 34 are fastened on the fastening holder 14.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A fastening configuration in a motor vehicle, comprising:
   a liquid container; and
   a fastening holder configured to fasten the liquid container on a body of the motor vehicle,
   wherein the liquid container is displaceable on the fastening holder along a generally straight path between a first position and a second position.

2. The fastening configuration according to claim 1, wherein the liquid container comprises a holding arm that is displaceable on the fastening holder.

3. The fastening configuration according to claim 2, wherein the holding arm comprises a grooved recess that is configured for use by the holding arm to provide displaceabilty on the fastening holder.

4. The fastening configuration according to claim 3, further comprising a fastening element configured to connect the holding arm to the fastening holder.

5. The fastening configuration according to claim 4, wherein the fastening element is situated within the grooved recess.

6. The fastening configuration according to claim 4, wherein the fastening element is a screw connection.

7. The fastening configuration according to claim 3, wherein fixing of the holding arm in the first position and in the second position is performed via a cross-sectional change provided in the grooved recess.

8. The fastening configuration according to claim 7, wherein the grooved recess includes detents that form the cross-sectional change to fix the holding arm within the groove recess in the first position or the second position.

9. The fastening configuration according to claim 1, further comprising a guide on the fastening holder configured to guide the liquid container.

10. The fastening configuration according to claim 1, further comprising
    a holding arm extending from the liquid container, the holding arm having an elongated recess, and
    a fastening element configured to connect the holding arm to the fastening holder through the elongated recess such that, upon loosening of the fastening element, the holding arm and liquid container are generally displaceable relative to fastening holder along the elongated recess and such that, upon tightening the fastening element, the holding arm and liquid container are generally fixed relative to the fastening element, and
    wherein the liquid container includes a guide groove and wherein the fastening holder includes a guide flange engaging the guide groove such that the guide flange guides the liquid container as the holding arm is displaced on the fastening holder.

11. The fastening configuration according to claim 1, further comprising a holding arm extending vertically upward from the liquid container for attaching the liquid container to the fastening holder such that the liquid container is arranged underneath the fastening holder.

12. A motor vehicle, comprising:
    an engine compartment;
    a windshield positioned over the engine compartment;
    a battery positioned within the engine compartment;
    a liquid container; and
    a fastening holder configured to fasten the liquid container in the engine compartment of the motor vehicle between the windshield and the battery,
    wherein the liquid container is displaceable on the fastening holder along a generally straight path between a first position and a second position.

13. The motor vehicle according to claim 12, wherein the liquid container comprises a holding arm that is displaceable on the fastening holder.

14. The motor vehicle according to claim 13, wherein the holding arm comprises a grooved recess that is configured for use by the holding arm to provide displaceabilty on the fastening holder.

15. The motor vehicle according to claim 14, further comprising a fastening element configured to connect the holding arm to the fastening holder.

16. The motor vehicle according to claim 15, wherein the fastening element is situated within the grooved recess.

17. The motor vehicle according to claim 15, wherein the fastening element is a screw connection.

18. The motor vehicle according to claim 14, wherein fixing of the holding arm in the first position and in the second position is performed via a cross-sectional change provided in the grooved recess.

19. The motor vehicle according to claim 12, further comprising a guide on the fastening holder configured to guide the liquid container.

* * * * *